United States Patent
Chen et al.

(10) Patent No.: US 11,877,144 B2
(45) Date of Patent: Jan. 16, 2024

(54) SIDELINK RESOURCE ALLOCATION ENHANCEMENTS

(71) Applicant: MediaTek Singapore Pte. Ltd., Singapore (SG)

(72) Inventors: Tao Chen, Beijing (CN); Lung-Sheng Tsai, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 162 days.

(21) Appl. No.: 17/394,908

(22) Filed: Aug. 5, 2021

(65) Prior Publication Data

US 2022/0046483 A1  Feb. 10, 2022

(30) Foreign Application Priority Data

Jul. 20, 2021 (CN) .......................... 202110821034.7

(51) Int. Cl.
| | |
|---|---|
| *H04W 28/26* | (2009.01) |
| *H04W 72/02* | (2009.01) |
| *H04L 5/00* | (2006.01) |
| *H04W 72/20* | (2023.01) |
| *H04W 92/18* | (2009.01) |

(52) U.S. Cl.
CPC ........... *H04W 28/26* (2013.01); *H04L 5/0051* (2013.01); *H04W 72/02* (2013.01); *H04W 72/20* (2023.01); *H04W 92/18* (2013.01)

(58) Field of Classification Search
CPC . H04W 28/26; H04W 72/02; H04W 72/0406; H04W 92/18; H04W 72/20; H04W 4/40; H04W 56/001; H04W 28/0268; H04W 48/20; H04L 5/0051; H04L 1/0003; H04L 1/18

See application file for complete search history.

(56) References Cited

U.S. PATENT DOCUMENTS

| 2020/0178216 | A1* | 6/2020 | Huang | H04L 1/0003 |
| 2020/0178290 | A1* | 6/2020 | Lee | H04W 72/20 |
| 2022/0022179 | A1* | 1/2022 | Fouad | H04W 4/40 |
| 2022/0240209 | A1* | 7/2022 | Zhao | H04W 56/001 |

FOREIGN PATENT DOCUMENTS

| CN | 113661748 A | * | 11/2021 | ............ H04W 48/20 |
| WO | WO-2018082445 A1 | * | 5/2018 | ............... H04L 1/18 |
| WO | WO-2020033422 A1 | * | 2/2020 | ........ H04W 28/0268 |

(Continued)

OTHER PUBLICATIONS

Taiwan Intellectual Property Office, Office Action for Taiwan Patent Application No. 110128014, dated Feb. 9, 2022.

*Primary Examiner* — Ayaz R Sheikh
*Assistant Examiner* — Louis Samara
(74) *Attorney, Agent, or Firm* — Han IP PLLC; Andy M. Han

(57) ABSTRACT

Various examples and schemes pertaining to enhancements for sidelink (SL) resource allocation in New Radio (NR) vehicle-to-everything (V2X) communications are described. A user equipment (UE) transmits to a peer UE assistance information with respect to a result of sensing of one or more resources reserved for a SL communication. The UE then receives a transmission from the peer UE on a resource selected by the peer UE based on the assistance information.

20 Claims, 4 Drawing Sheets

(56) References Cited

FOREIGN PATENT DOCUMENTS

| WO | WO 2020033422 A1 | 2/2020 | |
|----|------------------|--------|---|
| WO | WO-2020068252 A1 * | 4/2020 | ............... H04L 1/08 |
| WO | WO 2020068252 A1 | 4/2020 | |
| WO | WO-2020222443 A1 * | 11/2020 | ........... H04L 1/0003 |
| WO | WO-2021207459 A1 * | 10/2021 | ............ H04W 72/02 |

* cited by examiner

SIDELINK RESOURCE ALLOCATION ENHANCEMENTS

CROSS REFERENCE TO RELATED PATENT APPLICATION(S)

The present claims the priority benefit of China Patent Application No. CN 202110821034.7, filed 20 Jul. 2021, which is part of a Chinese national stage application of PCT Application No. PCT/CN2020/107805, filed 7 Aug. 2020. Contents of aforementioned applications are herein incorporate by reference in their entirety.

TECHNICAL FIELD

The present disclosure is generally related to wireless communications and, more particularly, to enhancements for sidelink (SL) resource allocation.

BACKGROUND

Unless otherwise indicated herein, approaches described in this section are not prior art to the claims listed below and are not admitted as prior art by inclusion in this section.

Under the 3$^{rd}$ Generation Partnership Project (3GPP) specifications for 5$^{th}$ Generation (5G) New Radio (NR), vehicle-to-everything (V2X) SL communication can be supported by unicast, groupcast and broadcast communications. However, there remain certain issues that need to be addressed with respect to SL resource allocation to improve the reliability and reduce the latency of SL communications. Therefore, there is a need for a solution of enhancements for SL resource allocation.

SUMMARY

The following summary is illustrative only and is not intended to be limiting in any way. That is, the following summary is provided to introduce concepts, highlights, benefits and advantages of the novel and non-obvious techniques described herein. Selected implementations are further described below in the detailed description. Thus, the following summary is not intended to identify essential features of the claimed subject matter, nor is it intended for use in determining the scope of the claimed subject matter.

One objective of the present disclosure is to propose various schemes, concepts, designs, methods, systems and apparatuses pertaining to enhancements for SL resource allocation. It is believed that various schemes proposed herein may provide enhancements for SL resource allocation as a way to address certain issues in V2X communications.

In one aspect, a method may involve transmitting to a peer user equipment (UE) assistance information with respect to a result of sensing of one or more resources reserved for a SL communication. The method may also involve receiving a transmission from the peer UE on a resource selected by the peer UE based on the assistance information.

In another aspect, a method may involve receiving from a peer UE assistance information with respect to a result of sensing of one or more resources reserved for a SL communication. The method may also involve performing a transmission to the peer UE on a resource selected based on the assistance information.

In still another aspect, an apparatus may include a transceiver and a processor coupled to the transceiver. The transceiver may be configured to communicate wirelessly in a V2X network. The processor may be configured to transmit, via the transceiver, to a peer UE assistance information with respect to a result of sensing of one or more resources reserved for a SL communication. The processor may be also configured to receive, via the transceiver, a transmission from the peer UE on a resource selected by the peer UE based on the assistance information.

In yet another aspect, an apparatus may include a transceiver and a processor coupled to the transceiver. The transceiver may be configured to communicate wirelessly in a V2X network. The processor may be configured to receive, via the transceiver, from a peer UE assistance information with respect to a result of sensing of one or more resources reserved for a SL communication. The processor may be also configured to perform, via the transceiver, a transmission to the peer UE on a resource selected based on the assistance information.

It is noteworthy that, although description provided herein may be in the context of certain radio access technologies, networks and network topologies such as 5G/NR V2X, the proposed concepts, schemes and any variation(s)/derivative (s) thereof may be implemented in, for and by other types of radio access technologies, networks and network topologies such as, for example and without limitation, Long-Term Evolution (LTE), LTE-Advanced, LTE-Advanced Pro, Wireless Fidelity (Wi-Fi) and any future-developed networks and technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
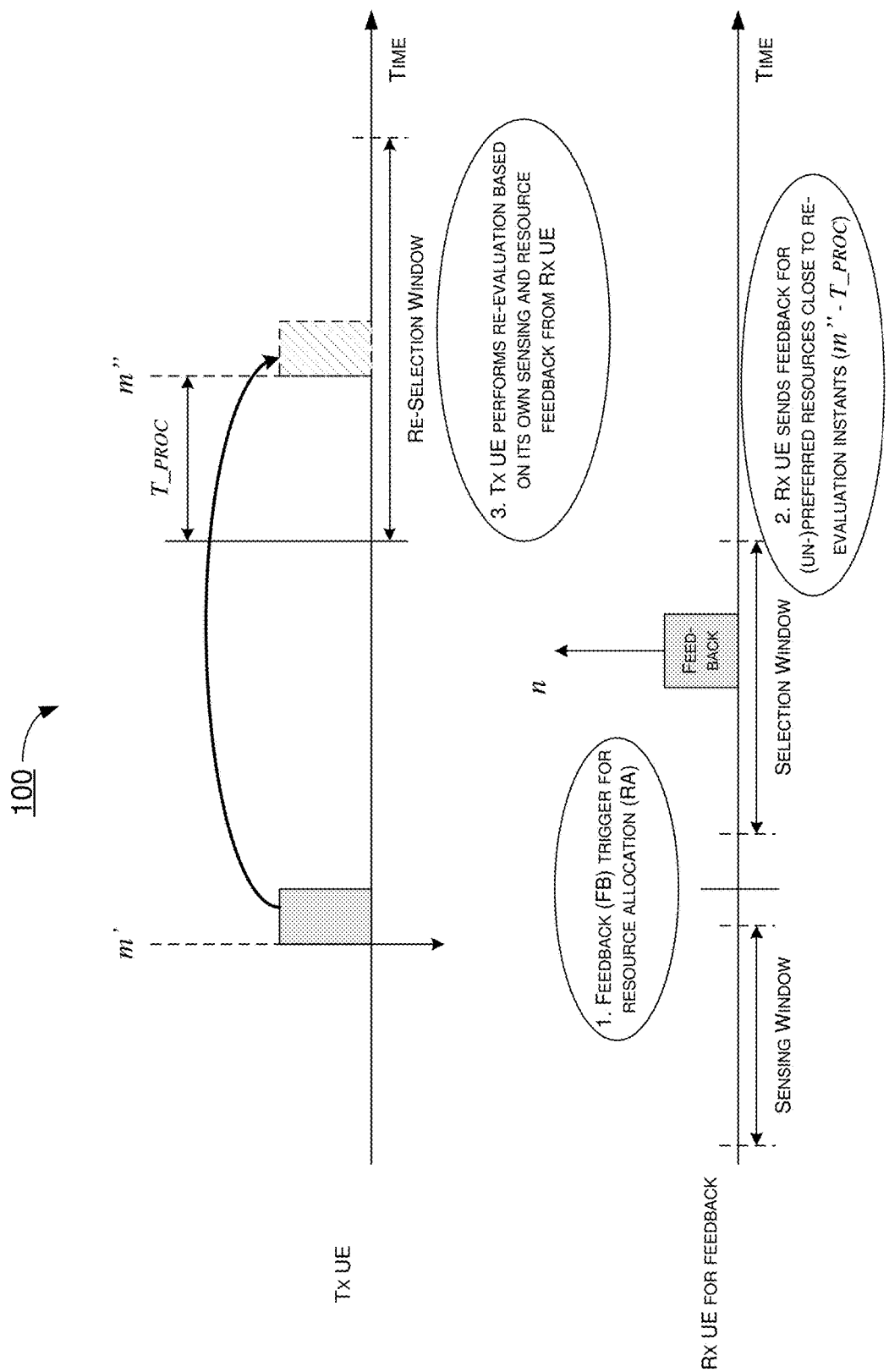
FIG. 1 is a diagram of an example scenario in accordance with the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to enhancements for SL resource allocation in NR V2X communications. According to the present disclosure, a number of possible solutions or schemes may be implemented separately or jointly. That is, although these possible solutions/schemes may be described below separately, two or more of these possible solutions/schemes may be implemented in one combination or another.

Under a proposed scheme in accordance with the present disclosure regarding SL resource allocation, a receiving (Rx) user equipment (UE)-assisted resource allocation mechanism may be applied to improve reliability and reduce overall latency for SL communications. Such Rx UE-assisted resource allocation mechanism may be implemented or utilized independently or jointly with a peer transmitting (Tx) UE-based sensing and resource allocation mechanism. Under the proposed scheme, Rx UE may autonomously send (e.g., by broadcast, unicast or groupcast) feedback information (herein interchangeably referred to as "assistance information") to the peer Tx UE (herein interchangeably referred to as "Tx UE") or, alternatively, Rx UE may be triggered to send (e.g., by broadcast, unicast or groupcast) the assistance information upon reception of a transmission of sidelink control information (SCI) and/or data from Tx UE.

The assistance information sent by Rx UE as feedback to Tx UE may carry resource sensing information from Rx UE, channel state information (CSI), observed Doppler/delay/moving speed related information (which may be related to an absolute speed or a relative speed between Tx UE and Rx UE), and/or multiple-input-multiple-output (MIMO) related feedback information to assist Tx UE in performing resource, modulation coding scheme (MCS), MIMO and/or demodulation reference signal (DMRS) pattern selection. The resource sensing information may include preferred or unpreferred (herein denoted as "(un-)preferred") time and/or frequency resources based on sensing performed by Rx UE. Sensing at Rx UE side may be similar to sensing at Tx UE side. That is, Rx UE may perform sensing on Rx resource pool(s) for reception (or on Tx resource pool(s) for transmission performed by the peer Tx UE) by measuring a reference signal received power (RSRP) according to detected SCI from other UE(s) on sensed resource pool(s).

Under the proposed scheme, Tx UE may inform Rx UE of the Rx resource pool(s) for sensing (or the Tx resource pool(s) for transmission by Tx UE) via signaling so that Rx UE may provide sensing results to assist Tx UE in performing resource selection or re-selection (herein denoted as "(re-)selection"). Alternatively, the resource pool(s) to be sensed may be configured or pre-configured (herein denoted as "(pre-)configured") and, in such cases, no signaling from Tx UE to Rx UE would be required.

Based on a number of factors, including: the measured RSRP, the priority of the peer Tx UE's transmission, the priority of sensed UE(s), and/or the corresponding resources reserved by SCI from the peer Tx UE, the Rx UE may determine whether or not the resource(s) reserved by the peer Tx UE is/are preferred from the perspective of Rx UE, thereby avoiding the hidden node problem. Here, the priority of the peer Tx UE's transmission may be determined according to the priority indicated in SCI or a (pre-)configured priority for a medium access control (MAC) flow or a link pair between the Rx UE and Tx UE. The priority of the sensed UE(s) may be obtained from the SCI from other UE(s) as detected by the Rx UE when perform sensing. To facilitate the decision at Rx UE, a RSRP threshold may be set according to a combination of the priority of the peer Tx UE's transmission and the priority of the transmission of the sensed UE(s). Rx UE may compare the measured RSRP of the sensed Tx UE's control DMRS transmission and/or data DMRS transmission with the RSRP threshold to determine whether or not the reserved resources are preferred/unpreferred or otherwise acceptable or unacceptable (herein denoted as "(un-)acceptable"). For example, in case the measured RSRP is lower than the RSRP threshold, the reserved resources may be determined as acceptable or preferred. Otherwise, in case the measured RSRP is higher than the RSRP threshold, the reserved resources may be determined as unacceptable or unpreferred.

In addition to the (un-)preferred/(un-)acceptable resources determined based on resource sensing results, in the feedback Rx UE may also provide CSI information to Tx UE. Such CSI information may correspond to the preferred/acceptable (reserved) resources which may be used for MCS selection once the resource(s) is/are used by Tx UE. Additionally, the observed Doppler/delay/moving speed related information or preferred DMRS pattern from the perspective of Rx UE may be carried in the assistance information so that Tx UE may select a suitable DMRS pattern (e.g., a certain number of DMRS symbols in a slot) for transmission.

Under a proposed scheme in accordance with the present disclosure, it may be preferred for Rx UE to transmit to Tx UE the assistance information sometime before Tx UE performs transmission on one or more reserved Tx resources. Upon receiving the assistance information, Tx UE may take into account the assistance information in performing resource re-selection and/or resource utilization. Moreover, Rx UE may obtain information on the reserved Tx resource(s) based on SCI received from Tx UE and, according to this information, Rx UE may determine a feedback timing based on a time instant for transmission on the reserved Tx resources by also considering an additional amount of time for Tx UE to process the assistance information. Accordingly, Rx UE may update Tx UE with the latest assistance information, e.g., updated feedback information based on the determined feedback timing for transmitting the assistance information. That is, Rx UE may continue to update the assistance information till the determined feedback timing at which point the assistance information is transmitted to the Tx UE.

Under the proposed scheme, Rx UE may perform partial sensing (e.g., periodic sensing or aperiodic one-shot sensing) or full sensing to determine preference and/or acceptability of the reserved resource(s). Then, Rx UE may send the assistance information before transmission on the reserved resources by the peer Tx UE or before the time for (re-)selection or re-evaluation with respect to the reserved resources. In case of multiple available or qualified resources for transmission of the assistance information, the resource(s) closest to the time instant for re-evaluation of the reserved resources indicated in SCI by Tx UE (and, optionally, with the additional time for processing of the assistance information also being considered) may be prioritized for selection so that the latest assistance information may be sent to the Tx UE to facilitate efficient resource (re-) selection or re-evaluation. For example, the latest time for transmission of the assistance information by Rx UE to Tx UE may be the time instant of the reserved resources minus a sum of the processing time for re-evaluation/re-selection by Tx UE and the processing time for assistance information reception and parsing by Tx UE. The Rx UE may take the transmission time for the reserved resources indicated in SCI as the packet delay budget to (re-)select the resources for transmission of the assistance information. Alternatively, the latest time for transmission of the assistance information (e.g., packet delay budget for the assistance information) may be derived based on the time instant for the reserved resources and the time duration (e.g., the required processing time) indicated in SCI or (pre-)configured. For example, the latest time (or packet delay budget) for transmission of the assistance information may be equal to the time instant of the reserved resources minus a time duration, with the time duration including the processing time at Tx UE. In an event that such processing time is UE specific, it may be indicated in the SCI by the peer Tx UE. Otherwise, in an event that such processing time is common, it may be (pre-)configured and exchanged between UEs via signaling (e.g., PC5-radio resource control (RRC) signaling) or specified in the specification.

Under a proposed scheme in accordance with the present disclosure, the priority of the transmission of the assistance information as indicated in the SCI may be set to a (pre-)configured priority or a priority corresponding to the SCI from the peer Tx UE which triggers the transmission of the assistance information. In case of multiple resources reserved in the SCI by the peer Tx UE, the assistance information corresponding to each reserved resource may be sent before the transmission on that reserved resource.

It is noteworthy that the assistance information is intended to carry the latest feedback information to assist the Tx UE. In case of re-selection of the resources for transmission of the assistance information, the contents of the assistance information may be updated according to the latest information before the time instant of the re-selected resources for the assistance information transmission. The processing time at Rx UE to update the assistance information before the transmission may be taken into account for preparation. That is, the assistance information may be updated based on the latest information before or at the time instant which is derived from the time (re-)selected for assistance information transmission and corresponding processing time at Rx UE. For example, the time instant may be equal to the time (re-)selected for transmission of the assistance information minus the processing time at Rx UE.

Under a proposed scheme in accordance with the present disclosure, the assistance information may be carried in a standalone SCI with or without a physical sidelink shared channel (PSSCH). Alternatively, the assistance information may also be carried in the PSSCH, especially when there is a traffic (e.g., data) for transmission in the PSSCH. In some cases, the second SCI in two-stage SCI may be used to carry such assistance information with a field indicating whether the assistance information is carried in the second SCI and/or whether the assistance information is carried in the second SCI with or without a data channel (e.g., PSSCH).

Under a proposed scheme in accordance with the present disclosure, the resources for transmission of the assistance information (carried in second SCI, PSSCH or any feedback channel) may be implicitly and/or explicitly derived from the SCI received from the peer Tx UE. For instance, the resources may be determined based on a function of Tx UE identification (ID) and/or Rx UE ID within a (pre-)configured resource set (e.g., a set of time resources and/or frequency resources). Due to the unique link pair or Tx/Rx UE IDs, the frequency resources for transmission of the assistance information may be unique or differentiated with those of other pairs. The time of a reserved resource may be a function of the time for the reserved resource indicated in SCI. For instance, it may be a time offset from the time for the reserved resource or the re-evaluation time of the reserved resources (e.g., derived/indicated in the SCI as above mentioned), taking into account the processing time of Tx UE. The time offset may be fixed or indicated in SCI or (pre-)configured. Moreover, the time offset may be (pre-)configured per resource pool. Accordingly, Rx UE may determine the time/frequency resources in a (pre-)configured resource set based on the SCI received from the Tx UE for transmission of the assistance information carried in second SCI, PSSCH or any (feedback) channel. Advantageously, such explicit signaling or implicit inference for resource determination may help avoid sensing and resource selection procedure for transmission of the assistance information.

Under a proposed scheme in accordance with the present disclosure, to further reduce signaling overhead of Rx UE-assisted resource allocation, rather than transmitting to Tx UE all sensing results, Rx UE may transmit the top N results among a plurality of sensing results (or CSI information) sorted according to a preference, which may be measured by priority or RSRP. The value of N may be configurable or otherwise predetermined. For example, Rx UE may only provide information related to three resources (N=3) with the highest RSRP.

FIG. 1 illustrates an example scenario 100 under various proposed schemes with respect to transmission of assistance information from a Rx UE to a peer Tx UE. At stage 1, upon reception of SCI at m' from the peer Tx UE, the Rx UE may be triggered to perform resource selection within a selection window for transmission of assistance information based on sensing (e.g., partial sensing or full sensing) performed by Rx UE in the past, e.g., during a sensing window. It is noteworthy that the Rx UE may perform sensing at a Tx resource pool of the peer Tx UE for assistance information generation as well as its own Tx resource pool for assistance information transmission. The Tx resource pool of the peer Tx UE may be (pre-)configured for the Rx UE or indicated via PC-5 RRC signaling exchange between the Rx UE and the peer Tx UE. This, however, may impose a restriction on the Tx resource pool for transmission at Tx UE. The SCI received at a first time instant m' may indicate a reserved resource at a second time instant m" (and a processing time T_proc). The Rx UE may attempt to select one or more resources for transmission of assistance information close to a time instant (m"−T_proc) which may be before or at a re-evaluation time for the reserved resource(s) at m". At stage 2, the Rx UE may transmit the assistance information carrying the latest information over the selected resource(s) at n (≤m"−T_proc). At stage 3, the peer Tx UE may perform re-evaluation of the reserved resource(s) at m" based on its own sensing results and the assistance information from the Rx UE. The assistance information may indicate whether or not the reserved resource(s) at m" is/are preferred or acceptable. The assistance information may further indicate CSI information for the reserved resource(s) in case the reserved resource(s) is/are acceptable and/or CSI information for other preferred resource(s) from the perspective of Rx UE according to the sensing and measurement performed by the Rx UE. The assistance information may further indicate a preferred DMRS pattern or Doppler related information for Tx UE to select a suitable DMRS pattern.

In view of the above, highlights of the various proposed schemes are summarize below.

With respect to the Rx UE-assisted resource allocation mechanism, the Rx UE may provide assistance information to the Tx UE sometime before (e.g., immediately before) the time instant of the reserved resource(s) to be used by Tx UE for transmission. The Rx UE may obtain information of reserved Tx resource(s) from the SCI received from Tx UE and, accordingly, determine feedback timing based on the time instant for transmission on the reserved Tx resource(s) by considering the additional time for Tx UE to process the assistance information.

With respect to the assistance information, the Rx UE may send the latest assistance information (e.g., updated feedback information) based on the timing of transmission of the assistance information.

With respect to resource pool for sensing, Tx UE may inform Rx UE the resource pool(s) for sensing (or the pool(s) for transmission by Tx UE) via signaling so that Rx UE may provide sensing results to assist the Tx UE in resource (re-)selection. Alternatively, such resource pool(s) may be (pre-)configured and hence no signaling would be necessary.

With respect to decision on resource preference or acceptance, Rx UE may determine whether or not the resource(s) reserved by Tx UE is/are preferred or otherwise acceptable. Such determination may be based on one or more of a plurality of factors including, for example and without limitation, the measured RSRP, the priority of the transmission by Tx UE, the priority of sensed UE(s), and the corresponding resource(s) reserved by SCI from Tx UE. In particular, Rx UE may compare the measured RSRP of sensed control and/or data DMRS transmission from Tx UE with the RSRP threshold to determine whether or not the reserved resource(s) is/are preferred or acceptable. The determined preference or non-preference with respect to the reserved resource(s) may be indicated in the assistance information sent by Rx UE to Tx UE. Upon receiving the assistance information from Rx UE, the Tx UE may select and use resource(s) based on both Tx UE's own sensing results and the assistance information (which includes Rx UE's sensing results) or based on the assistance information alone. Alternatively, upon receiving the assistance information from Rx UE, the Tx UE may re-select resource(s) based on the assistance information.

Illustrative Implementations

Figure 2:
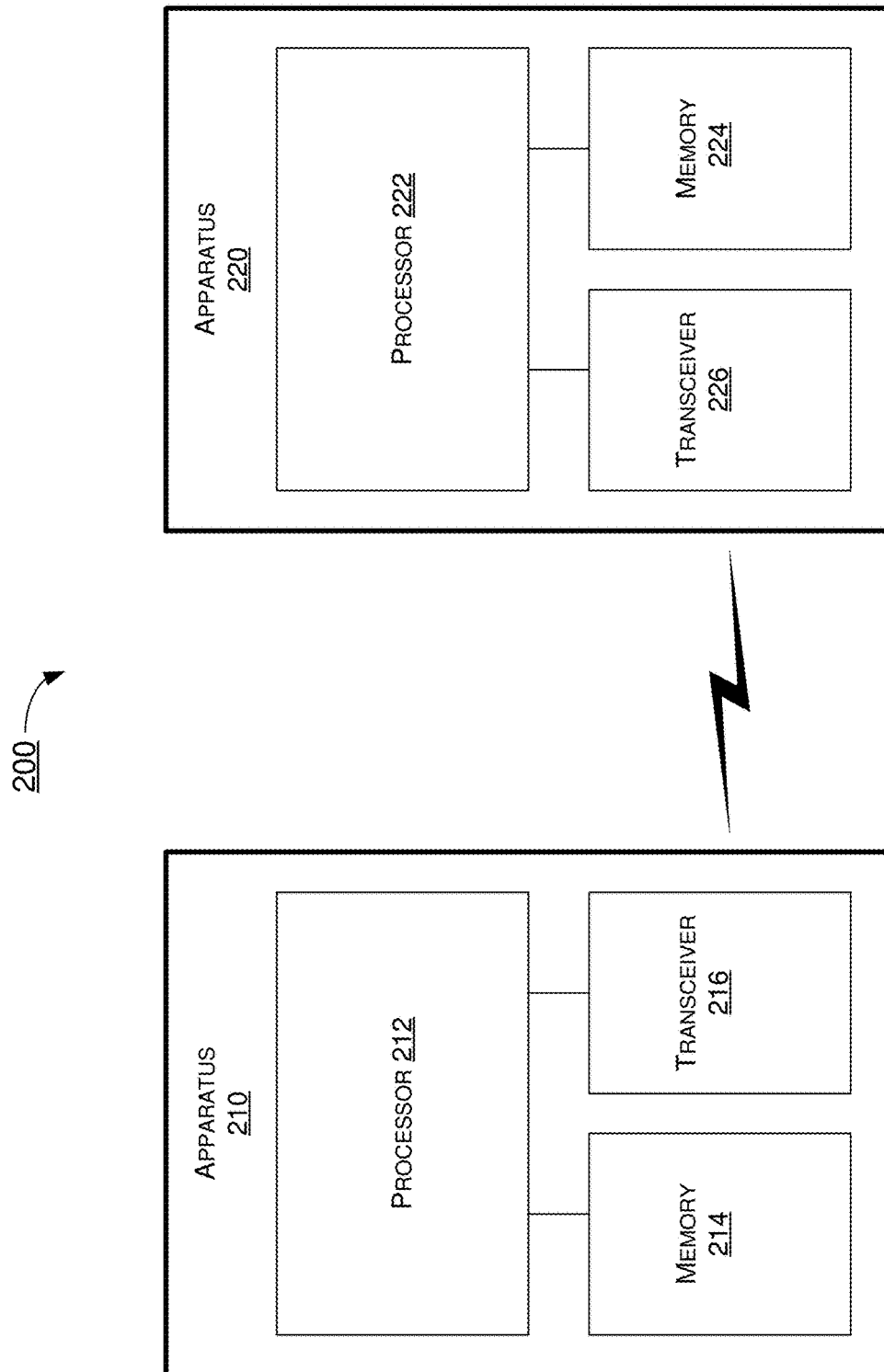
FIG. 2 is a block diagram of an example communication environment in which various proposed schemes in accordance with the present disclosure may be implemented.

FIG. 2 illustrates an example communication environment 200 having an example apparatus 210 and an example apparatus 220 in accordance with an implementation of the present disclosure. Each of apparatus 210 and apparatus 220 may perform various functions to implement schemes, techniques, processes and methods described herein pertaining to enhancements for SL resource allocation in NR V2X communications, including various schemes described herein.

Each of apparatus 210 and apparatus 220 may be a part of an electronic apparatus, which may be a UE such as a vehicle, a portable or mobile apparatus, a wearable apparatus, a wireless communication apparatus or a computing apparatus. For instance, each of apparatus 210 and apparatus 220 may be implemented in an electronic control unit (ECU) of a vehicle, a smartphone, a smartwatch, a personal digital assistant, a digital camera, or a computing equipment such as a tablet computer, a laptop computer or a notebook computer. Each of apparatus 210 and apparatus 220 may also be a part of a machine type apparatus, which may be an IoT or NB-IoT apparatus such as an immobile or a stationary apparatus, a home apparatus, a wire communication apparatus or a computing apparatus. For instance, each of apparatus 210 and apparatus 220 may be implemented in a smart thermostat, a smart fridge, a smart door lock, a wireless speaker or a home control center. Alternatively, each of apparatus 210 and apparatus 220 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Each of apparatus 210 and apparatus 220 may include at least some of those components shown in FIG. 2 such as a processor 212 and a processor 222, respectively. Each of apparatus 210 and apparatus 220 may further include one or more other components not pertinent to the proposed scheme of the present disclosure (e.g., internal power supply, display device and/or user interface device), and, thus, such component(s) of each of apparatus 210 and apparatus 220 are neither shown in FIG. 2 nor described below in the interest of simplicity and brevity.

In some implementations, at least one of apparatus 210 and apparatus 220 may be a part of an electronic apparatus, which may be a vehicle, a roadside unit (RSU), network node or base station (e.g., eNB, gNB or TRP), a small cell, a router or a gateway. For instance, at least one of apparatus 210 and apparatus 220 may be implemented in a vehicle in a V2V or V2X network, an eNodeB in an LTE, LTE-Advanced or LTE-Advanced Pro network or in a gNB in a 5G, NR, IoT or NB-IoT network. Alternatively, at least one of apparatus 210 and apparatus 220 may be implemented in the form of one or more IC chips such as, for example and without limitation, one or more single-core processors, one or more multi-core processors, one or more RISC processors, or one or more CISC processors.

In one aspect, each of processor 212 and processor 222 may be implemented in the form of one or more single-core processors, one or more multi-core processors, one or more RISC processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including enhancements for SL resource allocation in NR V2X communications in accordance with various implementations of the present disclosure.

In some implementations, apparatus 210 may also include a transceiver 216, as a communication device, coupled to processor 212 and capable of wirelessly transmitting and receiving data. In some implementations, apparatus 210 may further include a memory 214 coupled to processor 212 and capable of being accessed by processor 212 and storing data therein. In some implementations, apparatus 220 may also include a transceiver 226, as a communication device, coupled to processor 222 and capable of wirelessly transmitting and receiving data. In some implementations, apparatus 220 may further include a memory 224 coupled to processor 222 and capable of being accessed by processor 222 and storing data therein. Accordingly, apparatus 210 and apparatus 220 may wirelessly communicate with each other via transceiver 216 and transceiver 226, respectively.

To aid better understanding, the following description of the operations, functionalities and capabilities of each of apparatus 210 and apparatus 220 is provided in the context of a NR V2X communication environment in which apparatus 210 is implemented in or as a wireless communication device, a communication apparatus or a first UE (which may be the Rx UE or the peer Tx UE in scenario 100) and apparatus 220 is implemented in or as wireless communication device, a communication apparatus or a second UE (which may be the peer Tx UE or the Rx UE in scenario 100).

Under various proposed schemes pertaining to enhancements for SL resource allocation in NR V2X communications in accordance with the present disclosure, processor 212 of apparatus 210, as the Rx UE, may transmit, via transceiver 216, to a peer UE (e.g., apparatus 220 as the peer Tx UE) assistance information with respect to a result of sensing of one or more resources reserved for a SL communication. Moreover, processor 212 may receive, via transceiver 216, a transmission from the peer UE on a resource selected by the peer UE based on the assistance information.

In some implementations, the assistance information may indicate a preference or non-preference with respect to using the one or more reserved resources by the peer UE in performing the transmission.

In some implementations, processor 212 may perform additional operations. For instance, processor 212 may determine the preference or non-preference based on one or more of a measured RSRP on each of the one or more resources, a priority of the transmission by the peer UE, a priority of one or more other sensed UEs, and one or more corresponding resources reserved by SCI signaling from the peer UE. In some implementations, in determining the preference or non-preference, processor 212 may compare a measured RSRP of DMRS transmission by the one or more other sensed UEs with a RSRP threshold.

In some implementations, in transmitting the assistance information, processor 212 may transmit the assistance information by an amount of time before a time instant of the peer UE performs the transmission. In some implementations, the amount of time may include at least a processing time used by the peer UE in processing the assistance information.

In some implementations, in transmitting the assistance information, processor 212 may perform certain operations. For instance, processor 212 may determine a feedback timing to transmit the assistance information based on a time instant at which the peer UE performs the transmission and a processing time used by the peer UE in processing the assistance information. Moreover, processor 212 may update the assistance information till the assistance information is transmitted at the feedback timing.

In some implementations, processor 212 may perform additional operations. For instance, processor 212 may receive SCI signaling from the peer UE. Furthermore, processor 212 may obtain information on the one or more reserved resources from the SCI signaling.

In some implementations, processor 212 may perform other additional operations. For instance, processor 212 may determine one or more resource pools. Moreover, processor 212 may perform sensing on the one or more resource pools to measure a RSRP on each resource in the one or more resource pools to provide the result of sensing. In some implementations, the one or more resource pools comprises either or both of a Rx resource pool used to perform reception and a Tx resource pool used by the peer UE to perform the transmission. In some implementations, in determining the one or more resource pools, processor 212 may perform either: (a) receiving signaling from the peer UE indicating the one or more resource pools; or (b) determining the one or more resource pools based on configured or pre-configured information.

Under various proposed schemes pertaining to enhancements for SL resource allocation in NR V2X communications in accordance with the present disclosure, processor 222 of apparatus 220, as the Tx UE, may receive, via transceiver 226, from a peer UE (e.g., apparatus 210 as a Rx UE) assistance information with respect to a result of sensing of one or more resources reserved for a SL communication. Furthermore, processor 222 may perform, via transceiver 226, a transmission to the peer UE on a resource selected based on the assistance information.

In some implementations, the assistance information may indicate a preference or non-preference of the peer UE with respect to the one or more reserved resources being used in performing the transmission.

In some implementations, in performing the transmission, processor 222 may perform certain operations. For instance, processor 222 may perform sensing on a Tx resource pool to provide sensing results. Additionally, processor 222 may select the resource from the Tx resource pool based on the sensing results and the assistance information.

In some implementations, in performing the transmission, processor 222 may perform either: (a) selecting the resource from a Tx resource pool based on the assistance information; or (b) re-selecting the resource from a different Tx resource pool based on the assistance information.

Illustrative Processes

Figure 3:
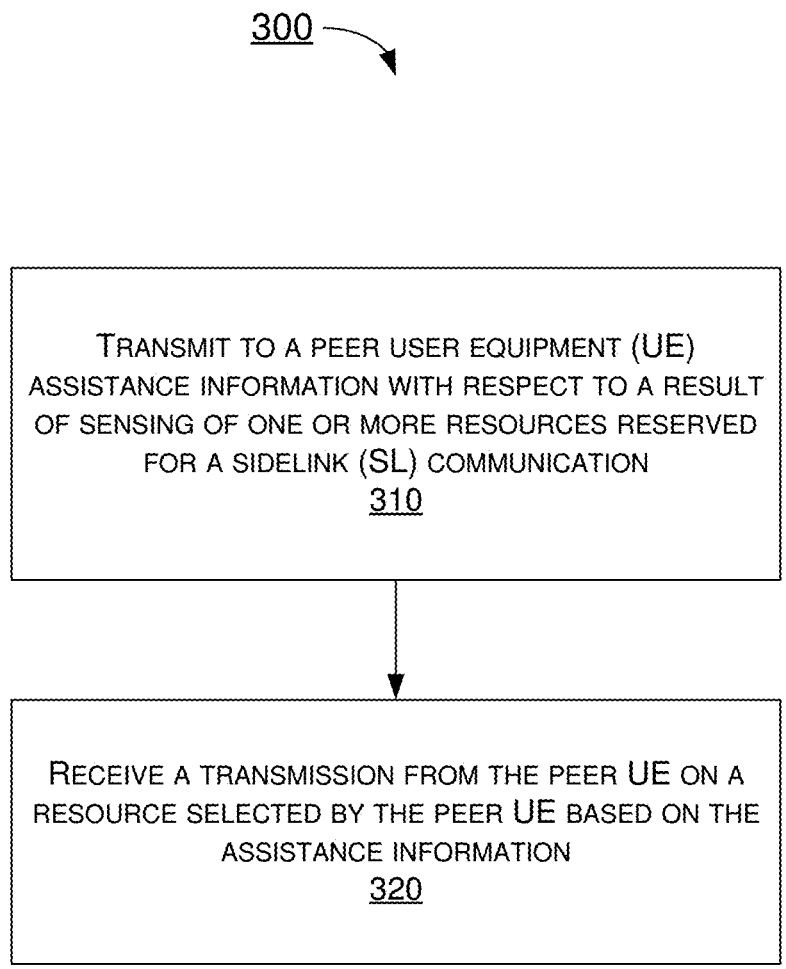
FIG. 3 is a flowchart of an example process in accordance with an implementation of the present disclosure.

FIG. 3 illustrates an example process 300 in accordance with an implementation of the present disclosure. Process 300 may be an example implementation of the proposed schemes described above with respect to enhancements for SL resource allocation in NR V2X communications in accordance with the present disclosure. Process 300 may represent an aspect of implementation of features of apparatus 210 and apparatus 220. Process 300 may include one or more operations, actions, or functions as illustrated by one or more of blocks 310 and 320. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may also be repeated partially or entirely. Process 300 may be implemented by apparatus 210, apparatus 220 and/or any suitable wireless communication device, UE, roadside unit (RUS), base station or machine type devices. Solely for illustrative purposes and without limitation, process 300 is described below in the context of apparatus 210 as a first UE (such as a Rx UE or a Tx UE in a V2X network) and apparatus 220 as a second UE (such as a Tx UE or a Rx UE in the V2X network). Process 300 may begin at block 310.

At block 310, process 300 may involve processor 212 of apparatus 210, as a Rx UE, transmitting, via transceiver 216, to a peer UE (e.g., apparatus 220 as a peer Tx UE) assistance information with respect to a result of sensing of one or more resources reserved for a SL communication. Process 300 may proceed from block 310 to block 320.

At block 320, process 300 may involve processor 212 receiving, via transceiver 216, a transmission from the peer UE on a resource selected by the peer UE based on the assistance information.

In some implementations, the assistance information may indicate a preference or non-preference with respect to using the one or more reserved resources by the peer UE in performing the transmission.

In some implementations, process 300 may involve processor 212 performing additional operations. For instance, process 300 may involve processor 212 determining the preference or non-preference based on one or more of a measured RSRP on each of the one or more resources, a priority of the transmission by the peer UE, a priority of one or more other sensed UEs, and one or more corresponding resources reserved by SCI signaling from the peer UE. In some implementations, in determining the preference or non-preference, process 300 may involve processor 212 comparing a measured RSRP of DMRS transmission by the one or more other sensed UEs with a RSRP threshold.

In some implementations, in transmitting the assistance information, process 300 may involve processor 212 transmitting the assistance information by an amount of time before a time instant of the peer UE performs the transmission. In some implementations, the amount of time may include at least a processing time used by the peer UE in processing the assistance information.

In some implementations, in transmitting the assistance information, process 300 may involve processor 212 performing certain operations. For instance, process 300 may involve processor 212 determining a feedback timing to transmit the assistance information based on a time instant at which the peer UE performs the transmission and a processing time used by the peer UE in processing the assistance information. Moreover, process 300 may involve processor 212 updating the assistance information till the assistance information is transmitted at the feedback timing.

In some implementations, process 300 may involve processor 212 performing additional operations. For instance, process 300 may involve processor 212 receiving SCI signaling from the peer UE. Furthermore, process 300 may involve processor 212 obtaining information on the one or more reserved resources from the SCI signaling.

In some implementations, process 300 may involve processor 212 performing other additional operations. For instance, process 300 may involve processor 212 determining one or more resource pools. Moreover, process 300 may involve processor 212 performing sensing on the one or more resource pools to measure a RSRP on each resource in the one or more resource pools to provide the result of sensing. In some implementations, the one or more resource pools comprises either or both of a Rx resource pool used to perform reception and a Tx resource pool used by the peer UE to perform the transmission. In some implementations, in determining the one or more resource pools, process 300 may involve processor 212 performing either: (a) receiving signaling from the peer UE indicating the one or more resource pools; or (b) determining the one or more resource pools based on configured or pre-configured information.

Figure 4:
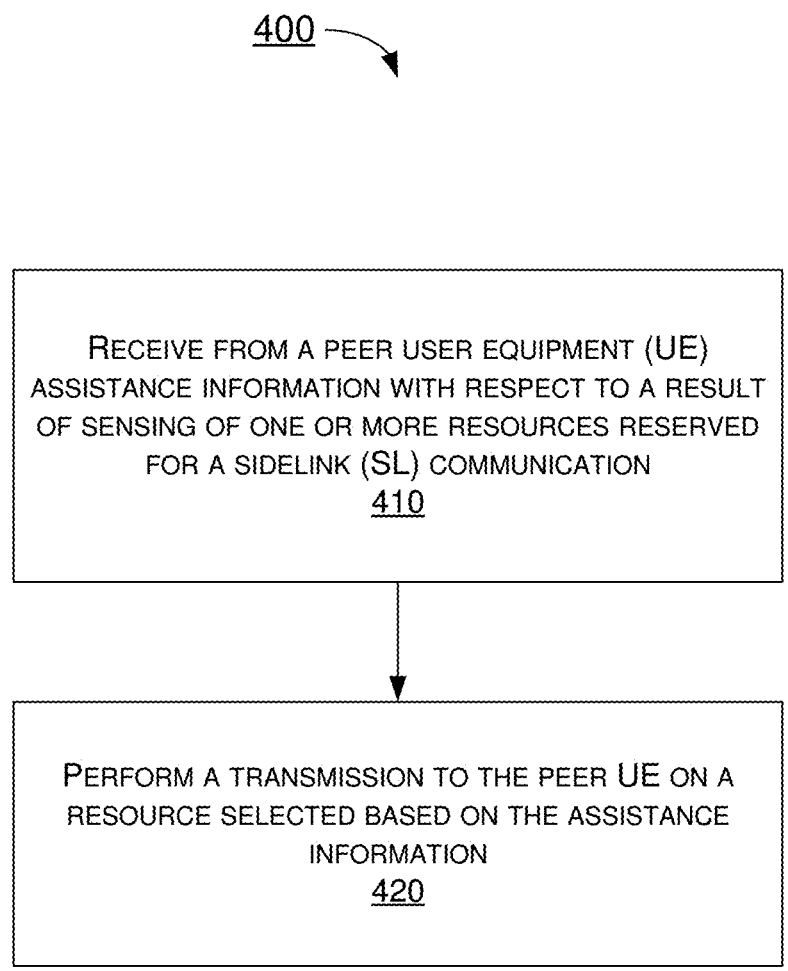
FIG. 4 is a flowchart of an example process in accordance with an implementation of the present disclosure.

FIG. 4 illustrates an example process 400 in accordance with an implementation of the present disclosure. Process 400 may be an example implementation of the proposed schemes described above with respect to enhancements for SL resource allocation in NR V2X communications in accordance with the present disclosure. Process 400 may represent an aspect of implementation of features of apparatus 210 and apparatus 220. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may also be repeated partially or entirely. Process 400 may be implemented by apparatus 210, apparatus 220 and/or any suitable wireless communication device, UE, roadside unit (RUS), base station or machine type devices. Solely for illustrative purposes and without limitation, process 400 is described below in the context of apparatus 210 as a first UE (such as a Rx UE or a Tx UE in the V2X network) and apparatus 220 as a second UE (such as a Tx UE or a Rx UE in a V2X network). Process 400 may begin at block 410.

At block 410, process 400 may involve processor 222 of apparatus 220, as a Tx UE, receiving, via transceiver 226, from a peer UE (e.g., apparatus 210 as a Rx UE) assistance information with respect to a result of sensing of one or more resources reserved for a SL communication. Process 400 may proceed from block 410 to block 420.

At block 420, process 400 may involve processor 222 performing, via transceiver 226, a transmission to the peer UE on a resource selected based on the assistance information.

In some implementations, the assistance information may indicate a preference or non-preference of the peer UE with respect to the one or more reserved resources being used in performing the transmission.

In some implementations, in performing the transmission, process 400 may involve processor 222 performing certain operations. For instance, process 400 may involve processor 222 performing sensing on a Tx resource pool to provide sensing results. Additionally, process 400 may involve processor 222 selecting the resource from the Tx resource pool based on the sensing results and the assistance information.

In some implementations, in performing the transmission, process 400 may involve processor 222 performing either: (a) selecting the resource from a Tx resource pool based on the assistance information; or (b) re-selecting the resource from a different Tx resource pool based on the assistance information.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    transmitting to a peer user equipment (UE) assistance information with respect to a result of sensing of one or more resources reserved for a sidelink (SL) communication; and
    receiving a transmission from the peer UE on a resource selected by the peer UE based on the assistance information,
    wherein the transmitting of the assistance information comprises:
        determining a feedback timing, based on a time instant at which the peer UE performs the transmission, to transmit the assistance information; and
        updating the assistance information till the assistance information is transmitted at the feedback timing,
    wherein the assistance information assists the peer UE in performing in performing selection of one or more of resource, modulation coding scheme (MCS), and demodulation reference signal (DMRS) pattern, thereby improving reliability and reducing latency of SL communications.

2. The method of claim 1, wherein the assistance information indicates a preference or non-preference with respect to using the one or more reserved resources by the peer UE in performing the transmission.

3. The method of claim 2, further comprising:
    determining the preference or non-preference based on one or more of a measured reference signal received power (RSRP) on each of the one or more resources, a priority of the transmission by the peer UE, a priority of one or more other sensed UEs, and one or more corresponding resources reserved by sidelink control information (SCI) signaling from the peer UE.

4. The method of claim 3, wherein the determining of the preference or non-preference comprises comparing a measured RSRP of demodulation reference signal (DMRS) transmission by the one or more other sensed UEs with a RSRP threshold.

5. The method of claim 1, wherein the transmitting of the assistance information comprises transmitting the assistance information by an amount of time before a time instant of the peer UE performs the transmission.

6. The method of claim 5, wherein the amount of time comprises at least a processing time used by the peer UE in processing the assistance information.

7. The method of claim 1, wherein the determining of the feedback timing further comprises:
    determining the feedback timing further based on a processing time used by the peer UE in processing the assistance information.

8. The method of claim 1, further comprising:
    receiving sidelink control information (SCI) signaling from the peer UE; and
    obtaining information on the one or more reserved resources from the SCI signaling.

9. The method of claim 1, further comprising:
    determining one or more resource pools; and
    performing sensing on the one or more resource pools to measure a reference signal received power (RSRP) on each resource in the one or more resource pools to provide the result of sensing.

10. The method of claim 9, wherein the one or more resource pools comprises either or both of a reception (Rx) resource pool used to perform reception and a transmission (Tx) resource pool used by the peer UE to perform the transmission.

11. The method of claim 9, wherein the determining of the one or more resource pools comprises either:
receiving signaling from the peer UE indicating the one or more resource pools; or
determining the one or more resource pools based on configured or pre-configured information.

12. A method, comprising:
receiving from a peer user equipment (UE) assistance information with respect to a result of sensing of one or more resources reserved for a sidelink (SL) communication; and
performing a transmission to the peer UE on a resource selected based on the assistance information,
wherein the assistance information is updated by the peer UE till the assistance information is received from the peer UE at a feedback timing which is determined based on:
a time instant at which the peer UE transmits the assistance information, and
a processing time used by the peer UE in processing the assistance information.

13. The method of claim 12, wherein the assistance information indicates a preference or non-preference of the peer UE with respect to the one or more reserved resources being used in performing the transmission.

14. The method of claim 12, wherein the performing of the transmission comprises:
performing sensing on a transmission (Tx) resource pool to provide sensing results; and
selecting the resource from the Tx resource pool based on the sensing results and the assistance information.

15. The method of claim 12, wherein the performing of the transmission comprises either:
selecting the resource from a transmission (Tx) resource pool based on the assistance information; or
re-selecting the resource from a different Tx resource pool based on the assistance information.

16. An apparatus, comprising:
a transceiver configured to communicate wirelessly in a vehicle-to-everything (V2X) network; and
a processor coupled to the transceiver and configured to perform operations comprising:
transmitting, via the transceiver, to a peer user equipment (UE) assistance information with respect to a result of sensing of one or more resources reserved for a sidelink (SL) communication; and
receiving, via the transceiver, a transmission from the peer UE on a resource selected by the peer UE based on the assistance information,
wherein, in transmitting the assistance information, the processor performs operations comprising:
determining a feedback timing, based on a time instant at which the peer UE performs the transmission, to transmit the assistance information; and
updating the assistance information till the assistance information is transmitted at the feedback timing,
wherein the assistance information assists the peer UE in performing in performing selection of one or more of resource, modulation coding scheme (MCS), and demodulation reference signal (DMRS) pattern, thereby improving reliability and reducing latency of SL communications.

17. The apparatus of claim 16, wherein the assistance information indicates a preference or non-preference with respect to using the one or more reserved resources by the peer UE in performing the transmission, and wherein the processor determines the preference or non-preference based on one or more of a measured reference signal received power (RSRP) on each of the one or more resources, a priority of the transmission by the peer UE, a priority of one or more other sensed UEs, and one or more corresponding resources reserved by sidelink control information (SCI) signaling from the peer UE.

18. The apparatus of claim 16, wherein, in transmitting the assistance information, via the transceiver, the processor transmits the assistance information by an amount of time before a time instant of the peer UE performs the transmission, and wherein the amount of time comprises at least a processing time used by the peer UE in processing the assistance information.

19. The apparatus of claim 16, wherein, in determining the feedback timing, the processor further performs operations comprising:
determining the feedback timing further based on a processing time used by the peer UE in processing the assistance information.

20. The apparatus of claim 16, wherein the processor is further configured to perform operations comprising:
determining one or more resource pools by:
receiving signaling from the peer UE indicating the one or more resource pools; or
determining the one or more resource pools based on configured or pre-configured information; and
performing sensing on the one or more resource pools to measure a reference signal received power (RSRP) on each resource in the one or more resource pools to provide the result of sensing,
wherein the one or more resource pools comprises either or both of a reception (Rx) resource pool used to perform reception and a transmission (Tx) resource pool used by the peer UE to perform the transmission.

* * * * *